(12) United States Patent
Yonezawa et al.

(10) Patent No.: US 8,876,415 B2
(45) Date of Patent: Nov. 4, 2014

(54) OPTICAL COMMUNICATION MODULE

(71) Applicant: Hitachi Cable, Ltd., Tokyo (JP)

(72) Inventors: Hidenori Yonezawa, Hitachi (JP);
Yoshinori Sunaga, Hitachinaka (JP);
Yoshiaki Ishigami, Hitachi (JP); Kinya Yamazaki, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 13/873,057

(22) Filed: Apr. 29, 2013

(65) Prior Publication Data

US 2014/0086528 A1 Mar. 27, 2014

(30) Foreign Application Priority Data

Sep. 26, 2012 (JP) ................. 2012-212138

(51) Int. Cl.
*G02B 6/36* (2006.01)
*G02B 6/42* (2006.01)
*G02B 6/32* (2006.01)

(52) U.S. Cl.
CPC ............. *G02B 6/32* (2013.01); *G02B 6/4214* (2013.01); *G02B 6/423* (2013.01); *G02B 6/4249* (2013.01)
USPC ......................................................... 385/93

(58) Field of Classification Search
USPC ......................................................... 385/93
See application file for complete search history.

(56) References Cited

U.S. PATENT DOCUMENTS

| 6,160,936 | A  | * | 12/2000 | You et al. ................... 385/49 |
| 7,441,965 | B2 | * | 10/2008 | Furuno et al. ............... 385/93 |
| 7,894,691 | B2 | * | 2/2011  | Ikeda et al. ................. 385/14 |
| 2004/0202477 | A1 |  | 10/2004 | Nagasaka et al. |

FOREIGN PATENT DOCUMENTS

| JP | 2004-246279 A | 9/2004 |
| JP | 2006-065358 A | 3/2006 |

* cited by examiner

*Primary Examiner* — Ryan Lepisto
(74) *Attorney, Agent, or Firm* — McGinn IP Law Group, PLLC (57) ABSTRACT

An optical communication module includes an optical element array, a supporting member on which the optical element array is placed, an optical member for optically coupling the optical element array and a plurality of optical fibers together, a plurality of grooves provided in the supporting member or the optical member, and a plurality of protrusions provided on the optical member or the supporting member in correspondence with the grooves respectively. The grooves and the protrusions are mated together. The grooves are provided as being widened toward their openings. The grooves and the protrusions are each provided so that a location in a width direction at which no relative locational misalignment occurs therebetween lies on a line through the center of the optical element array. The grooves and the protrusions are each provided on at least two or more different lines through the center of the optical element array.

19 Claims, 5 Drawing Sheets

OPTICAL COMMUNICATION MODULE

The present application is based on Japanese patent application No. 2012-212138 filed on Sep. 26, 2012, the entire contents of which are incorporated herein by reference.

BACKGROUND OF THE INVENTION

1. Field of the Invention

This invention relates to an optical communication module, which converts an electrical signal into an optical signal and outputs it, or converts an optical signal into an electrical signal and outputs it.

2. Description of the Related Art

In optical communications, multichannel transmission is being used with increasing communication speed. An optical communication module for the multichannel transmission uses an optical element array which comprises easy-to-array surface emitting elements such as VCSELs (Vertical Cavity Surface Emitting LASERs) or the like or surface receiving elements such as photodiodes or the like, arranged in array. The optical element array is placed on a supporting member (a substrate) comprising a crystalline material such as a metal material, a ceramic material, silicon, or the like.

In the optical communication module, optical fibers to optically connect to the optical element array are typically disposed parallel to a surface of the supporting member, so that routing thereof is facilitated. Accordingly, an optical member (also referred to as "lens block" or "optical block") is used in order to optically couple together the optical element array, from which light enters or exits perpendicular to the surface of the supporting member, and the optical fibers, from which light enters or exits parallel to the surface of the supporting member.

For example, in JP-A-2004-246279, an optical member having condensing lenses and an optical path bending reflective surface is disposed between an optical element array and optical fibers in which optical paths lie in a 90 degree direction to the optical element array. The optical member, which is made of resin or glass, is generally used.

Now, when assembling the optical communication module, it is necessary to align the optical member and the optical element array.

A known method to align the optical member and the optical element array is to operate the optical element array then determine a location of the optical member while observing light intensity transmitted to the optical fibers. However, this aligning method has been very time-consuming due to requiring electrical wiring, operation of the optical element array and measurement. It has been questionable from the point of view of mass production.

A known method to more conveniently align the optical member and the optical element array is to mechanically align them without operating the optical element array.

JP-A-2006-65358 proposes an aligning method by providing guide pins in a supporting member of an optical element array, while providing holes in an optical member and using the supporting member of the optical element array as a supporting member for the optical member as well.

Refer to JP-A-2004-246279 and JP-A-2006-65358, for example.

SUMMARY OF THE INVENTION

Now, a feature of the resin used as the optical member is that its thermal expansion or contraction is relatively great in comparison with the optical elements and the like. For this reason, a varying size difference between the optical element array or the supporting member and the optical member has arisen due to ambient temperature variation, and temperature variation caused by heat during operation of the optical element array and a semiconductor element in the module. Consequently, a locational misalignment has occurred between the optical element array and the optical member which are required to be aligned with high precision, and optical communication properties have worsened.

The method disclosed by JP-A-2006-65358 has been questionable in that it has failed to suppress the occurrence of the locational misalignment between the optical element array and the optical member due to such temperature variations, and further the thermal expansion of the optical member relative to the optical element array or the supporting member has been likely to cause deformation of the guide pins or the optical member.

In view of the foregoing circumstances, it is an object of the present invention to provide an optical communication module, which allows a mechanical and simple alignment between an optical member and an optical element array, and which is capable of suppressing a locational misalignment, even in the event of thermal expansion or contraction of the optical member.

According to a feature of the invention, an optical communication module comprises:

an optical element array comprising light emitting or receiving elements arranged in an array;

a supporting member on which the optical element array is placed;

a plurality of optical fibers optically connected to the optical element array;

an optical member for optically coupling the optical element array and the optical fibers together;

a plurality of grooves provided in the supporting member or the optical member; and a plurality of protrusions provided on the optical member or the supporting member in correspondence with the grooves respectively, wherein the grooves and the protrusions are mated together to thereby place the optical member on the supporting member and position the optical member relative to the optical element array, the grooves are provided as being widened toward their openings, or the protrusions are provided as being widened toward their base ends, to allow interference of the grooves and the protrusions at the time of expansion or contraction of the optical member to vary a distance between the supporting member and the optical member, the grooves and the protrusions are each provided in such a manner that a location in a width direction at which no relative locational misalignment occurs between the grooves and the protrusions at the time of expansion or contraction of the optical member lies on a line through the center of the optical element array in a plan view, and the grooves and the protrusions are each provided on at least two or more different lines through the center of the optical element array in a plan view.

In the embodiment, the following modifications and changes can be made.

(i) The grooves or the protrusions may be provided in a V shape in cross section in the width direction, and the V shape grooves or the V shape protrusions are provided in such a manner that a center location in the width direction thereof lies on the line through the center of the optical element array in a plan view.

(ii) Both the grooves and the protrusions may be provided in such a manner that one side surface in the width direction thereof is provided perpendicular to a surface of the supporting member, and that side surface lies on the line through the center of the optical element array in a plan view.

(iii) The grooves may be provided to be greater in length than the protrusions.

(iv) The supporting member may be composed of a silicon substrate, and the grooves may be provided in that silicon substrate.

(v) The optical member may include a lens array comprising a plurality of lenses provided and located opposite light emitting or receiving portions, respectively, of the optical element array, and is configured to bend an optical axis of light from the optical element array and pass the light to each of the optical fibers, or bend an optical axis of light from each of the optical fibers and pass the light to the optical element array.

(vi) The center in a plan view of the lens array and the center in a plan view of the optical element array may be aligned with each other.

Points of the Invention

According to the invention, it is possible to provide the optical communication module, which allows a mechanical and simple alignment between the optical member and the optical element array, and which is capable of suppressing a locational misalignment, even in the event of thermal expansion or contraction of the optical member.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

Below is described a preferred embodiment according to the invention, in conjunction with the accompanying drawings.

Figure 1A:
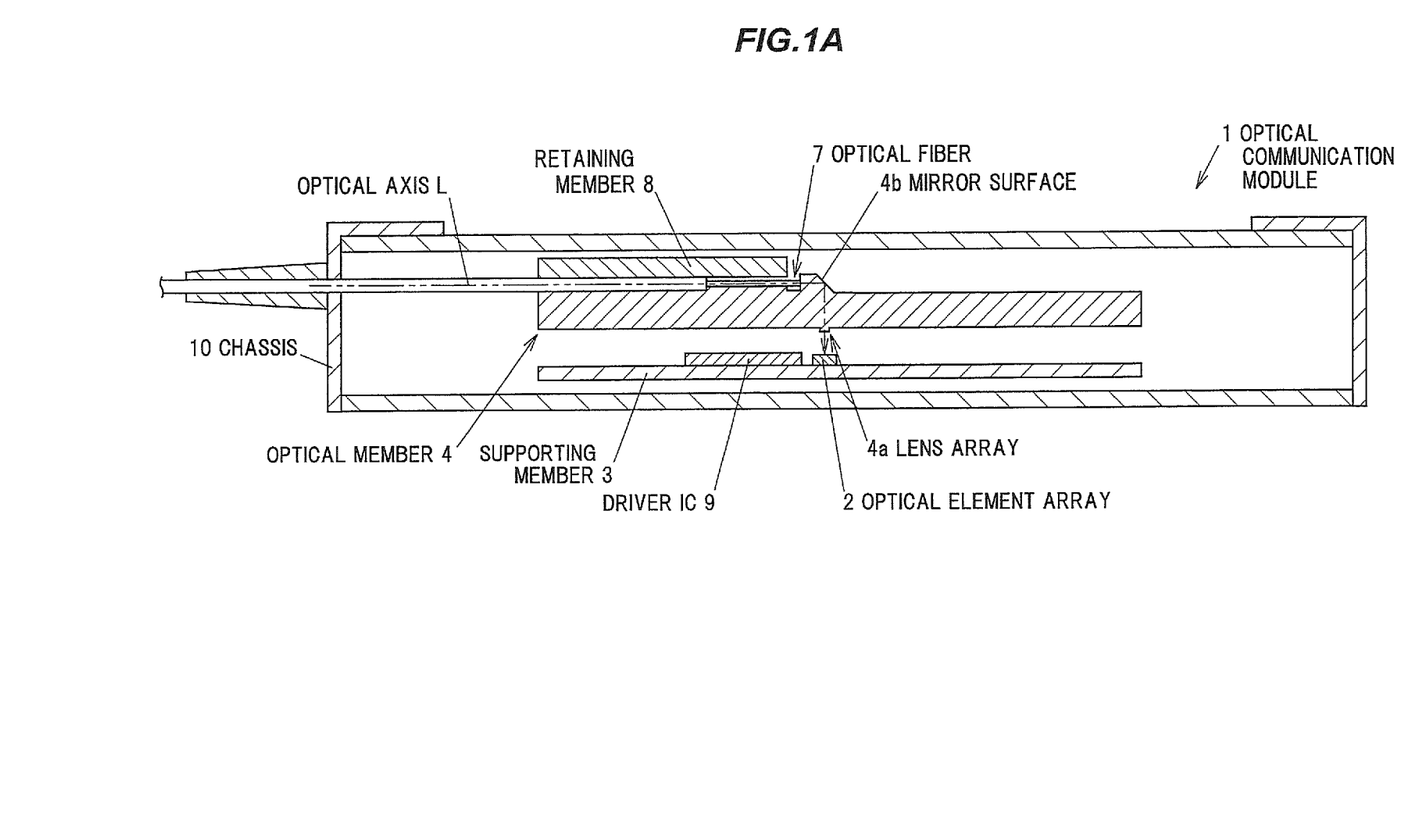
FIG. 1A is a longitudinal cross-sectional view showing an optical communication module in one embodiment according to the invention.
Figure 1B:
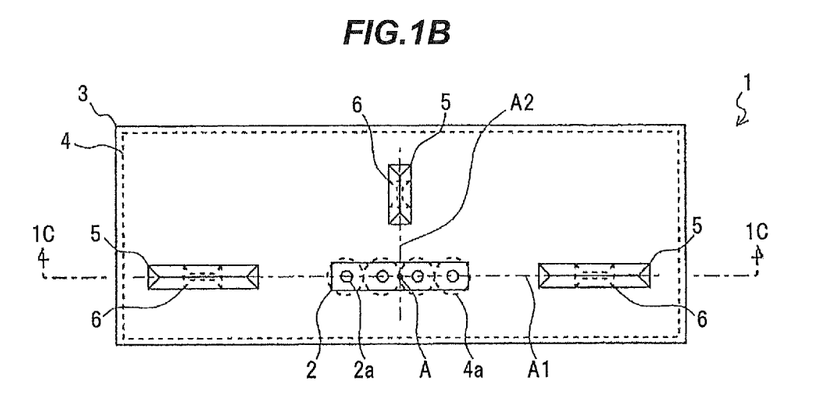
FIG. 1B is an enlarged top view showing a part of the optical communication module in the embodiment according to the invention, through which an optical member is seen.
Figure 1C:
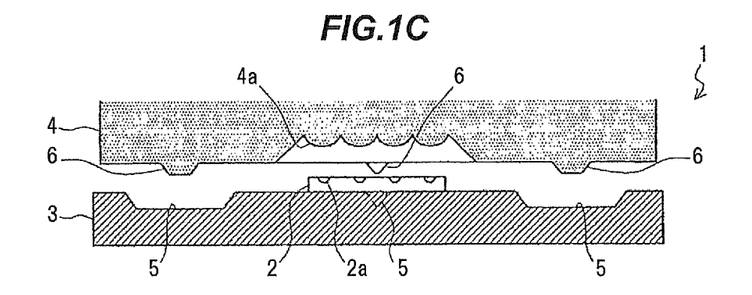
FIG. 1C is a cross-sectional view along line 1C-1C of FIG. 1B.
Figure 1D:
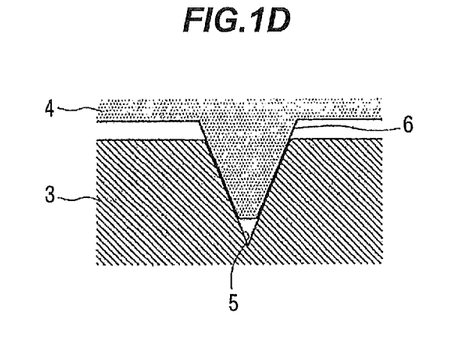
FIG. 1D is a cross-sectional view showing a mated state of a groove and a protrusion.

FIG. 1A is a longitudinal cross-sectional view showing an optical communication module in one embodiment according to the invention. FIG. 1B is an enlarged top view showing a part of the optical communication module in the embodiment according to the invention, through which an optical member is seen. FIG. 1C is a cross-sectional view along line 1C-1C of FIG. 1B. FIG. 1D is a cross-sectional view showing a mated state of a groove and a protrusion;

As shown in FIGS. 1A to 1C, the optical communication module 1 includes an optical element array 2, a supporting member 3, an optical member 4, optical fibers 7, a retaining member 8, a driver IC 9, and a chassis 10.

The optical element array 2 comprises light emitting elements arranged in an array, such as VCSELs or the like, or light receiving elements arranged in an array, such as photodiodes or the like, and is configured as light emitting or receiving portions 2a arrayed in one chip. In FIGS. 1B and 1C, the optical element array 2 is shown as the array of the four light emitting or receiving portions 2a, but the number of light emitting or receiving portions 2a is not limited thereto. The distance (pitch) between the adjacent light emitting or receiving portions 2a is, for example 250 µm.

The optical element array 2 is placed on the supporting member 3. The supporting member 3 is made of a crystalline material such as a metal material, a ceramic material, silicon, or the like. When the optical element array 2 is the light emitting elements, as shown in FIG. 1A, the driver IC 9 to drive the optical element array 2 is mounted on the supporting member 3. When the optical element array 2 is the light receiving elements, an amplifier IC to amplify a signal from the optical element array 2 is mounted instead of the driver IC 9 on the supporting member 3. The supporting member 3 is also provided with an electrical connector (not shown) and the like to connect to an external communication device and the like.

The optical fibers 7 are optically connected to the optical element array 2, and their respective tips are arranged parallel to the surface of the supporting member 3, in order to facilitate routing thereof.

The optical member 4 is for optically coupling the optical element array 2 and the optical fibers 7 together. In this embodiment, the optical member 4 includes a lens array 4a comprising a plurality (herein, four) of lenses provided and located opposite the light emitting or receiving portions 2a, respectively, of the optical element array 2, and a mirror surface 4b with an inclination angle of 45 degrees with respect to an optical axis L.

In a transmitting side optical communication module 1, the optical signals emitted from the optical element array 2 are focused or collimated by the lens array 4a provided at the optical member 4. Further, the focused or collimated optical signals are reflected by the mirror surface 4b provided at the optical member 4 in such a manner that an optical path thereof is converted (shifted) with an angle of 90 degrees. The optical signals are optically coupled to the optical fibers 7 provided at the optical member 4, then transmitted through the optical fibers 7, respectively, along the optical axis L. The optical signals are further optically transmitted to a receiving side optical communication module 1 (not shown) through the optical fibers 7 pulled out from the chassis 10.

The optical fibers 7 are sandwiched between the retaining member 8 and the optical member 4 and fixed by an adhesive and the like. The optical member 4 is provided with V grooves (not shown) to fix locations of tips of the optical fibers 7. The optical member 4 is made of resin or glass. The optical member 4 is disposed so that the center in a plan view of the lens array 4a and the center in a plan view of the optical element array 2 are aligned with each other.

The optical communication module 1 further includes a plurality of grooves 5 provided in the supporting member 3 or the optical member 4, and a plurality of protrusions 6 provided on the optical member 4 or the supporting member 3 in correspondence with the grooves 5 respectively, and is configured so that the grooves 5 and the protrusions 6 are mated together to thereby place the optical member 4 on the supporting member 3 and position the optical member 4 relative to the optical element array 2.

Although in this embodiment the grooves 5 are provided in the supporting member 3 while the protrusions 6 are provided on the optical member 4, the formation of the grooves 5 and the protrusions 6 is not limited thereto, but the protrusions 6 may be provided on the supporting member 3 while the grooves 5 may be provided in the optical member 4. Incidentally, when using a silicon substrate as the supporting member 3, it is possible to anticipate high fabrication accuracy in the silicon process, and it is therefore more desirable to form the grooves 5 in the supporting member 3.

The optical element array 2, the supporting member 3, the tips of the optical fibers 7 and the optical member 4 are received in the chassis 10. The optical fibers 7 are provided with the transmitting side optical communication module 1 at one end using the light emitting elements as the optical element array 2 and the receiving side optical communication module 1 at the other end using the light receiving elements as the optical element array 2, This results in an optical active cable. In other words, the optical active cable is one using the optical fibers common to the transmitting side optical communication module 1 and the receiving side optical communication module 1.

This optical active cable operates so that the transmitting side optical communication module 1 converts an electrical signal input from an external communication device and the like into an optical signal and passes the optical signal to the optical fibers 7, while the receiving side optical communication module 1 converts an optical signal input via the optical fibers 7 into an electrical signal and outputs the electrical signal to another external communication device and the like.

Now, the optical communication module 1 in this embodiment is configured so that the grooves 5 are provided as being widened toward their openings, or the protrusions 6 are provided as being widened toward their base ends, to allow interference of the grooves 5 and the protrusions 6 at the time of expansion or contraction of the optical member 4 to vary the distance between the supporting member 3 and the optical member 4.

In this embodiment, the grooves 5 are provided in the supporting member 3, while the protrusions 6 are provided on the optical member 4. For this reason, at low temperatures, the protrusions 6 contract relative to the grooves 5, so that the interference locations (contact locations) of the grooves 5 and the protrusions 6 move near to the bottoms of the grooves 5, and the distance between the supporting member 3 and the optical member 4 is small. Likewise, at high temperatures, the protrusions 6 expand relative to the grooves 5, so that the interference locations of the grooves 5 and the protrusions 6 move away from the bottoms of the grooves 5, and the distance between the supporting member 3 and the optical member 4 is large. Conversely, when the protrusions 6 are provided on the supporting member 3 while the grooves 5 are provided in the optical member 4, at low temperatures, the grooves 5 contract relative to the protrusions 6, so that the distance between the supporting member 3 and the optical member 4 is large. Likewise, at high temperatures, the grooves 5 expand relative to the protrusions 6, so that the distance between the supporting member 3 and the optical member 4 is small.

Although in this embodiment the grooves 5 are provided as being widened toward their openings and the protrusions 6 are provided as being widened toward their base ends, this may be satisfied for either the grooves 5 or the protrusions 6. That is, by forming the grooves 5 as being widened toward their openings, the protrusions 6 may be provided in any shape. It should be noted, however, that no reference location described later is considered to result from a combination of shapes of the grooves 5 and the protrusions 6. In this case, it is desirable that the protrusions 6 are provided in a left-right symmetric shape in cross section in a width direction. Also, in this case, in a deformation range due to assumed use temperatures, the interference locations of the grooves 5 and the protrusions 6 are required to be in contact with both respective side surfaces of the grooves 5. The reason is as follows: No contact of the interference locations with the side surfaces of the grooves 5 means either that the protrusions 6 are being slipped from the grooves 5, or that the protrusions 6 are being unconstrainedly freely moved in the width direction in the grooves 5. Either case causes a locational misalignment of the optical element array 2 and the optical member 4. For this reason, in the deformation range due to assumed use temperatures, the interference locations of the grooves 5 and the protrusions 6 are required to be in contact with both respective side surfaces of the grooves 5.

For a similar reason, if the protrusions 6 are provided as being widened toward their base ends and the grooves 5 are provided in any shape, then it is desirable that the grooves 5 are provided in a left-right symmetric shape in cross section in a width direction, and also, in the deformation range due to assumed use temperatures, the interference locations of the grooves 5 and the protrusions 6 are required to be in contact with both respective side surfaces of the protrusions 6.

In this embodiment, the grooves 5 and the protrusions 6 are provided in substantially the same V shape in cross section in the width direction, and are configured in surface contact with each other. It should be noted, however, that if the cross sectional shapes of the grooves 5 and the protrusions 6 are exactly the same, the supporting member 3 and the optical member 4 are contacted with each other, and the tips of the protrusions 6 are contacted with the bottoms of the grooves 5. In order to avoid this, in this embodiment, the height of the protrusions 6 is slightly greater than the depth of the grooves 5 and the tips of the protrusions 6 are chamfered.

Further, in the optical communication module 1 in this embodiment, the grooves 5 and the protrusions 6 are each provided in such a manner that a location in the width direction (referred to as "reference location") at which no relative locational misalignment occurs between the grooves 5 and the protrusions 6 at the time of expansion or contraction of the optical member 4 lies on lines A1 and A2 through the center A of the optical element array 2 in a plan view (top view).

Next, the reference location will be described below.

Figure 2A:
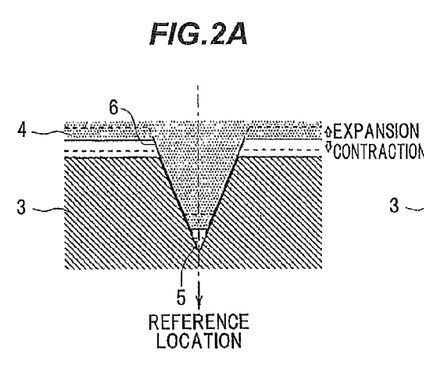
FIGS. 2A to 2D are explanatory diagrams showing a reference location in the invention.
Figure 2B:
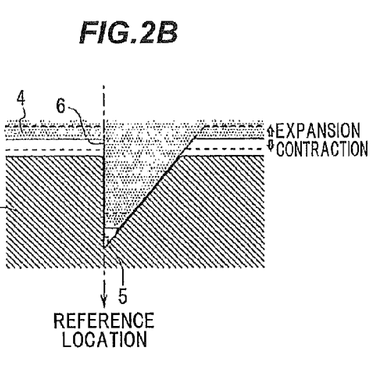
Figure 2C:
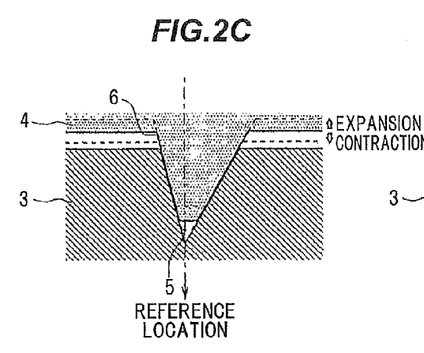

The reference location as shown in FIGS. 2A to 2C where the cross sectional shapes in the width direction of the groove 5 and the protrusion 6 are substantially the same (but the height of the protrusion 6 is slightly greater than the depth of the groove 5 and the tip of the protrusion 6 is chamfered.) will be considered as follows.

As shown in FIG. 2A, when the cross sectional shapes in the width direction of the groove 5 and the protrusion 6 are provided in substantially the same V shapes (isosceles triangle shapes), no locational misalignment occurs at the center location in the width direction thereof at the time of relative expansion or contraction of the protrusion 6. Thus, in this case, the center location in the width direction is the reference location. In this embodiment, the cross sectional shapes in the width direction of the groove 5 and the protrusion 6 are both provided in the V shapes, so that as shown in FIG. 1B, the respective center locations in the width direction of the grooves 5 and the protrusions 6 lie on and along the lines A1 and A2 through the center A of the optical element array 2 in a plan view.

As shown in FIG. 2B, when one side surface in the width direction of each of the groove 5 and the protrusion 6 is provided perpendicular to the surface of the supporting member 3, no locational misalignment occurs at that side surface. That side surface location is the reference location. Also, as shown in FIG. 2C, when a vertex at the bottom of the groove 5 is shifted from the center in the width direction of its opening, that vertex location is the reference location.

Figure 2D:
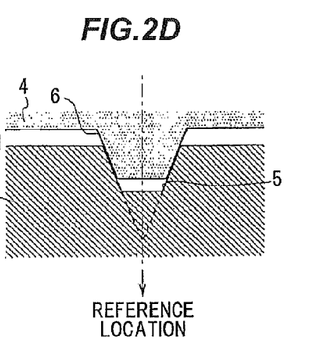

When the cross sectional shape of the groove 5 is triangular in this manner, its vertex location at the bottom of the groove 5 is the reference location. The grooves 5 and the protrusions 6 may be provided in such a manner that that reference location lies on the lines A1 and A2 through the center A of the optical element array 2 in a plan view. Incidentally, as shown in FIG. 2D, when the cross sectional shape in the width direction of the groove 5 is trapezoidal, a vertex location where side surfaces (oblique surfaces) of the trapezoidal groove 5 meet is the reference location.

Referring again to FIG. 1B, two sets of the grooves 5 and the protrusions 6 (i.e. one set of the groove 5 and the protrusion 6 and the other set of the groove 5 and the protrusion 6) are provided on the line A1 through the center A of the optical element array 2 in a plan view and in a direction in which the light emitting or receiving portions 2a are arrayed, in such a manner that the optical element array 2 is located between the two sets of the grooves 5 and the protrusions 6. These two sets of the grooves 5 and the protrusions 6 allow positioning in the vertical direction in FIG. 1B.

Here, if the lengths of the grooves 5 and the protrusions 6 are the same, no expansion in the horizontal direction in FIG. 1B is allowed. This causes the optical member 4 or the supporting member 3 to deform. Accordingly, the grooves 5 are provided to be greater in length than the protrusions 6, so that the protrusions 6 are movable in the longitudinal direction of the grooves 5.

For this reason, the two sets of the grooves 5 and the protrusions 6 provided on the line A1 allow positioning in the vertical direction in FIG. 1B, but no positioning in the horizontal direction in FIG. 1B is regulated. This allows the movement in the direction along the line A1 of the optical member 4 relative to the supporting member 3.

Accordingly, in the optical communication module 1, the groove 5 and the protrusion 6 are further provided on the line A2 through the center A of the optical element array 2 in a plan view and at right angles to the line A1, The groove 5 and the protrusion 6 provided on the line A2 allow positioning in the horizontal direction in FIG. 1B of the optical member 4 relative to the supporting member 3, Incidentally, the groove 5 provided on the line A2 is provided to be greater in length than the protrusion 6, allowing the movement along the line A2 of the protrusion 6.

Although herein the grooves 5 and the protrusions 6 are provided on the orthogonal lines A1 and A2, the formation of the grooves 5 and the protrusions 6 is not limited thereto, but the grooves 5 and the protrusions 6 may each be provided in such a manner that their reference location lies on at least two or more different lines through the center A of the optical element array 2 (in other words, on lines which radially extend from the center A of the optical element array 2) in a plan view.

With this configuration, thermal expansion or contraction of the optical member 4 is, in a plan view, radial expansion or contraction deformation thereof with the location of the optical member 4 (i.e. the center location of the lens array 4a) opposite the center A of the optical element array 2 being a fixed point, while in cross sectional view, the distance between the supporting member 3 and the optical member 4 varies with the movement in the width direction of each groove 5 and protrusion 6 being regulated.

Figure 3A:
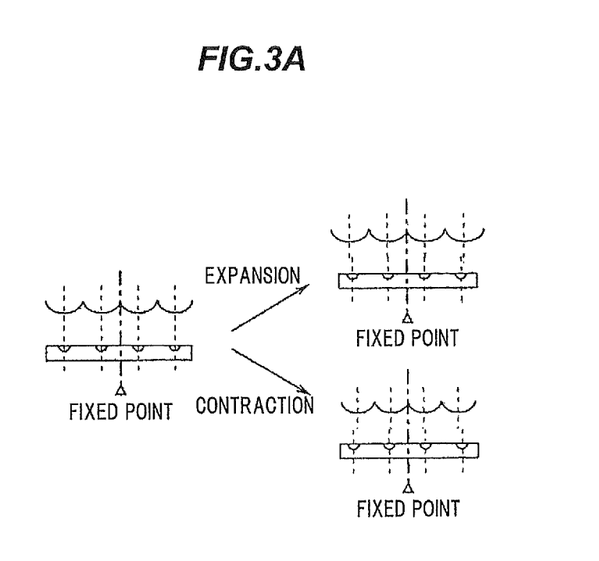
FIG. 3A is an explanatory diagram showing a locational misalignment between light emitting or receiving portions and lenses at the time of expansion or contraction of the optical member when the center of an optical element array and the center of the lenses are a fixed point.
Figure 3B:
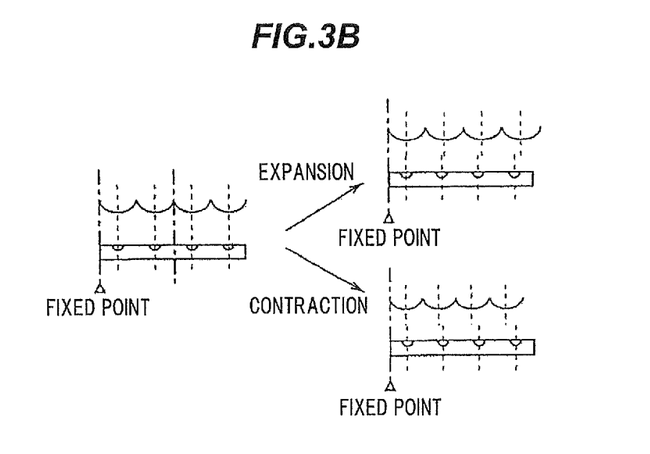
FIG. 3B is an explanatory diagram showing a locational misalignment between light emitting or receiving portions and lenses at the time of expansion or contraction of the optical member when an end of the optical element array and an end of the lenses are a fixed point.

As shown in FIG. 3A, setting the center A of the optical element array 2 (i.e. the center of the lens array 4a) at the fixed point allows for minimizing the locational misalignment between the light emitting or receiving portions 2a and the lenses 4a at the time of thermal expansion or contraction of the optical member 4. In contrast, for example as shown in FIG. 3B, setting an end of the optical element array 2 (an end of the lens array 4a) at the fixed point causes a significant locational misalignment between the light emitting or receiving portions 2a and each lens of the lens array 4a at the opposite end of the optical element array 2 to the end set at the fixed point, resulting in optical communication properties worsening.

As described above, the optical communication module 1 in this embodiment is configured as follows: The grooves 5 are provided as being widened toward their openings, or the protrusions 6 are provided as being widened toward their base ends, to allow interference of the grooves 5 and the protrusions 6 at the time of expansion or contraction of the optical member 4 to vary the distance between the supporting member 3 and the optical member 4. The grooves 5 and the protrusions 6 are each provided in such a manner that the location in the width direction (the reference location) at which no relative locational misalignment occurs between the grooves 5 and the protrusions 6 at the time of expansion or contraction of the optical member 4 lies on the lines A1 and A2 through the center A of the optical element array 2 in a plan view, and the grooves 5 and the protrusions 6 are each provided on the at least two or more different lines A1 and A2 through the center A of the optical element array 2 in a plan view.

With this configuration, it is possible to always maintain the center in a plan view of the optical element array 2 and the center in a plan view of the lens array 4a comprising the four lenses at the opposite locations while allowing the thermal expansion or contraction of the optical member 4 relative to the supporting member 3, suppress the locational misalignment of the optical member 4 relative to the optical element array 2, and suppress the optical communication property worsening. Also, it is possible to use the resin or the like as the material of the optical member 4 and the material is greater in thermal expansion or contraction than the optical elements and the like. This contributes to cost reduction.

Further, the optical communication module 1 can mechanically be aligned, and can easily be aligned without operation of the optical element array 2, and is excellent in mass production.

The invention is not limited to the above embodiment, but various alterations may naturally be made without departing from the spirit and scope of the invention.

Figure 4A:
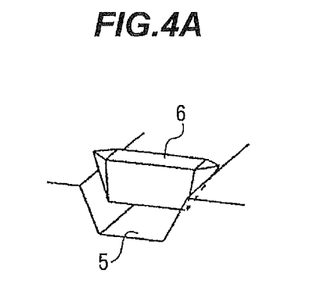
FIGS. 4A to 4D are diagrams showing a modification of the optical communication module of FIGS. 1A to 1D.
Figure 4B:
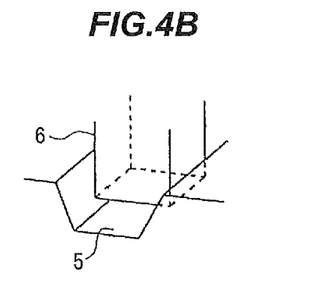
Figures 4C, 4D:
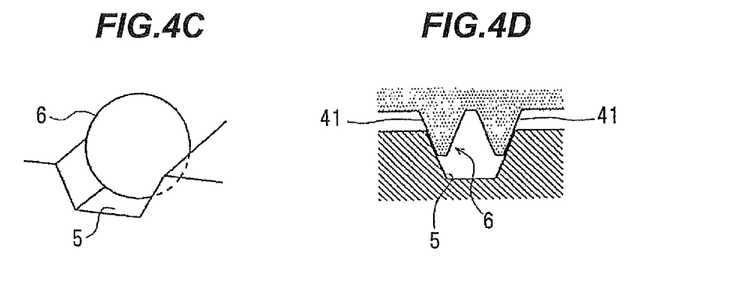

For example, although in the above embodiment it has been described that the groove 5 and the protrusion 6 are in surface contact with each other, the groove 5 and the protrusion 6 may be configured in linear contact with each other, by both side ends in the width direction of the protrusion 6 being tapered as shown in FIG. 4A, or the protrusion 6 being provided in a rectangular parallelepiped shape as shown in FIG. 4B. Also, the groove 5 and the protrusion 6 may be configured in point contact with each other, by the protrusion 6 being provided in a spherical shape as shown in FIG. 4C. Incidentally, the plural sets of grooves 5 and protrusions 6 are not required to be in the same shapes, but variously shaped grooves 5 and protrusions 6 may be included.

Also, as shown in FIG. 4D, two protrusions 41 may be configured as being mated into one groove 5. Incidentally, in this case, the two protrusions 41 are equivalent to one protrusion 6 because filling the space between the two protrusions 41 has the same effect.

Figure 5A:
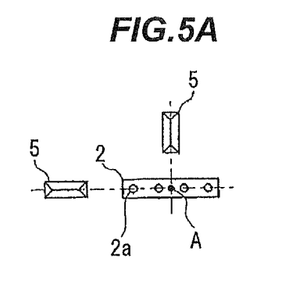
FIGS. 5A to 5D are diagrams showing a modification of the optical communication module of FIGS. 1A to 1D.
Figure 5B:
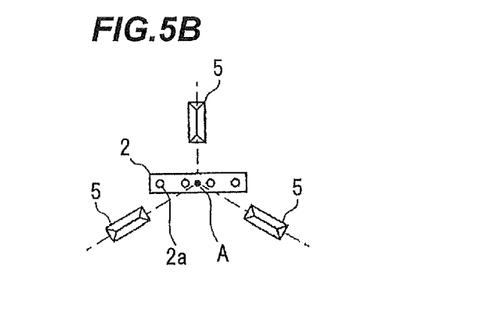

Also, although in the above embodiment the grooves 5 and the protrusions 6 are provided on the lines A1 and A2 in the direction in which the light emitting or receiving portions 2a of the optical element array 2 are arrayed and in the perpendicular direction respectively thereto, the locations at which the grooves 5 and the protrusions 6 are provided may appropriately be selected if the reference location thereof is a location on the lines which radially extend from the center A of the optical element array 2 in a plan view. For example, as shown in FIG. 5A, the groove 5 and the protrusion 6 on the left side of the optical element array 2 in FIG. 1B may be omitted, or as shown in FIG. 5B, the grooves 5 and the protrusions 6 may each be provided on the three lines which radially extend at 120, 240, and 360 degrees, respectively, from the center A of the optical element array 2.

Figure 5C:
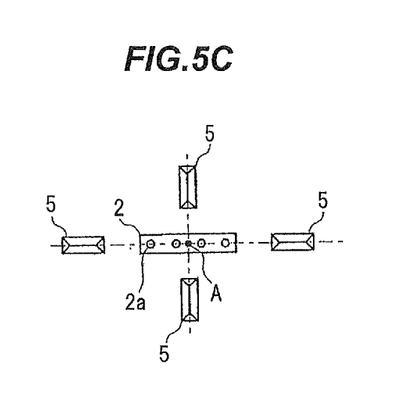
Figure 5D:
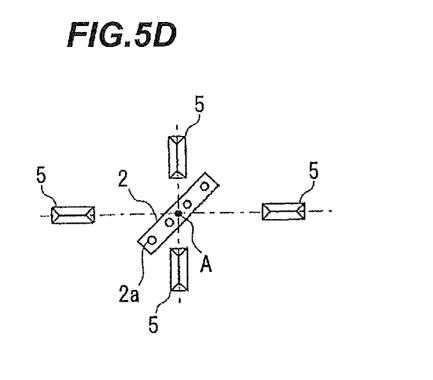

Also, as shown in FIG. 5C, a groove 5 and a protrusion 6 may further be provided on the lower side of the optical element array 2 in FIG. 1B, to enhance stability of installation of the optical member 4, or as shown in FIG. 5D, the optical element array 2 or the grooves 5 and the protrusions 6 in FIG. 5C may be rotated (herein, the optical element array 2 is shown as being rotated through 45 degrees) around the center A of the optical element array 2 in a plan view. Incidentally, for simplicity of illustration, FIGS. 5A to 5D are drawn by omitting the protrusions 6.

Further, although in the above embodiment it has been described that the side surfaces in the width direction of the grooves 5 or the protrusions 6 are tapered, the side surfaces in the width direction of the grooves 5 or the protrusions 6 are not limited thereto, but may naturally be provided in a circular arc shape (curved at a predetermined curvature), for example.

Also, although in the above embodiment the lenses are disposed in the location of the optical member 4 opposite the optical element array 2, the optical member 4 is not limited thereto, but may be replaced with, for example an optical member with no lens and reflector, and entry or exit surfaces of the optical fibers may be disposed in the location of that optical member opposite the optical element array 2.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An optical communication module, comprising:
   an optical element array comprising light emitting or receiving elements arranged in an array;
   a supporting member on which the optical element array is placed;
   a plurality of optical fibers optically connected to the optical element array;
   an optical member for optically coupling the optical element array and the optical fibers together;
   a plurality of grooves provided in the supporting member or the optical member; and
   a plurality of protrusions provided on the optical member or the supporting member in correspondence with the grooves respectively,
   wherein the grooves and the protrusions are mated together to thereby place the optical member on the supporting member and to position the optical member relative to the optical element array,
   wherein the grooves are provided as being widened toward their openings, or the protrusions are provided as being widened toward their base ends, to allow interference of the grooves and the protrusions at a time of expansion or contraction of the optical member to vary a distance between the supporting member and the optical member,
   wherein the grooves and the protrusions are each provided in such a manner that a location in a width direction thereof in which no relative locational misalignment occurs between the grooves and the protrusions at the time of expansion or contraction of the optical member lies on a line through a center of the optical element array in a plan view,
   wherein the grooves and the protrusions are each provided on at least two or more different lines through the center of the optical element array in a plan view, and
   wherein the grooves or the protrusions are provided in a V shape in cross section in the width direction thereof, and the V shape grooves or the V shape protrusions are provided in such a manner that their respective center location directions in the width direction thereof lie on the at least two or more different lines, respectively, through the center of the optical element array in the plan view.

2. The optical communication module according to claim 1, wherein both the grooves and the protrusions are provided in such a manner that one side surface in the width direction thereof is provided perpendicular to a surface of the supporting member, and that side surface lies on the line through the center of the optical element array in a plan view.

3. The optical communication module according to claim 1, wherein the grooves are provided to be greater in length than the protrusions.

4. The optical communication module according to claim 1, wherein the supporting member comprises a silicon substrate, and the grooves are provided in that silicon substrate.

5. The optical communication module according to claim 1, wherein the optical member includes a lens array comprising a plurality of lenses provided and located opposite light emitting or receiving portions, respectively, of the optical element array, and is configured to bend an optical axis of light from the optical element array and pass the light to each of the optical fibers, or bend an optical axis of light from each of the optical fibers and pass the light to the optical element array.

6. The optical communication module according to claim 5, wherein, in the plan view, a center of the lens array and the center of the optical element array are aligned with each other.

7. The optical communication module according to claim 1, wherein the respective center location directions of the V shape grooves or the V shape protrusions elongate in a lateral direction of the V shape grooves or the V shape protrusions.

8. The optical communication module according to claim 1, wherein, in each of the V shape grooves or the V shape protrusions, the respective center location direction elongates in a lateral direction of said each of the V shape grooves or the V shape protrusions.

9. The optical communication module according to claim 1, wherein, in each of the V shape grooves or the V shape protrusions, the respective center location direction lies on the at least two or more different lines.

10. The optical communication module according to claim 1, wherein, in each of the V shape grooves or the V shape protrusions, the respective center location direction in lies on the at least two or more different lines through the center of the optical element array.

11. The optical communication module according to claim 1, wherein one of the V shape grooves or the V shape protrusions elongates, in a lateral direction of the one of the V shape grooves or the V shape protrusions, perpendicular to a lateral direction of another one of the V shape grooves or the V shape protrusions.

12. The optical communication module according to claim 1, wherein one of the lines through the center of the optical element is perpendicular to another one of the lines through the center of the optical element.

13. The optical communication module according to claim 1, wherein one of the lines through the center of the optical element intersects in an acute angle with another one of the lines through the center of the optical element.

14. The optical communication module according to claim 1, wherein the optical fibers are configured to be provided with a transmitting side optical communication module at one end using the light emitting elements as the optical element array.

15. The optical communication module according to claim 14, wherein the optical fibers are configured to be provided with a receiving side optical communication module at another end using the light receiving elements as the optical element array.

16. The optical communication module according to claim 15, wherein the transmitting side optical communication module is configured to convert an electrical signal input from an external communication device into an optical signal and to pass the optical signal to the optical fibers.

17. The optical communication module according to claim 16, wherein the receiving side optical communication module is configured to convert the optical signal input through the optical fibers into another electrical signal and to output the electrical signal to another external communication device.

18. The optical communication module according to claim 1, wherein each of the lines through the center of the optical element array extends radially from the center of the optical element array.

19. The optical communication module according to claim 1, wherein, in the plan view, the optical element array elongates in a direction that makes an acute angle with each of the lines through the center of the optical element.

\* \* \* \* \*